United States Patent
Harada et al.

(10) Patent No.: US 8,834,801 B2
(45) Date of Patent: Sep. 16, 2014

(54) FLUE GAS DENITRIFICATION APPARATUS

(75) Inventors: Tomokazu Harada, Hiroshima (JP); Satoru Shishido, Hiroshima (JP); Toru Ogasahara, Hiroshima (JP)

(73) Assignee: Babcock-Hitachi Kabushiki Kaisha, Tokyo (JP)

(*) Notice: Subject to any disclaimer, the term of this patent is extended or adjusted under 35 U.S.C. 154(b) by 10 days.

(21) Appl. No.: 13/699,144

(22) PCT Filed: Jul. 5, 2011

(86) PCT No.: PCT/JP2011/003832
§ 371 (c)(1),
(2), (4) Date: Nov. 20, 2012

(87) PCT Pub. No.: WO2012/004980
PCT Pub. Date: Jan. 12, 2012

(65) Prior Publication Data
US 2013/0071296 A1 Mar. 21, 2013

(30) Foreign Application Priority Data

Jul. 8, 2010 (JP) ................................ 2010-155801

(51) Int. Cl.
B01D 50/00 (2006.01)
B01D 53/88 (2006.01)
F23J 15/02 (2006.01)
B01D 53/86 (2006.01)

(52) U.S. Cl.
CPC .......... *F23J 15/02* (2013.01); *B01D 2258/0283* (2013.01); *B01D 2257/404* (2013.01); *B01D 53/88* (2013.01); *B01D 53/885* (2013.01); *B01D 53/8631* (2013.01)
USPC .......................................... 422/170; 422/168

(58) Field of Classification Search
None
See application file for complete search history.

(56) References Cited

U.S. PATENT DOCUMENTS

2009/0065414 A1* 3/2009 Nelson et al. ................. 210/188

FOREIGN PATENT DOCUMENTS

| JP | 58-91441 | 6/1983 |
| JP | 58-143828 | 8/1983 |
| JP | 60-124629 | 8/1985 |
| JP | 60-183030 | 12/1985 |
| JP | 62-114623 | 7/1987 |
| JP | 2002-219336 | 8/2002 |
| JP | 2003-112015 | 4/2003 |

OTHER PUBLICATIONS

International Preliminary Report on Patentability for PCT/JP2011/003832, mailed Dec. 12, 2012.
International Search Report, mail date is Oct. 11, 2011.

* cited by examiner

Primary Examiner — Walter D Griffin
Assistant Examiner — Jelitza Perez
(74) Attorney, Agent, or Firm — Greenblum & Bernstein P.L.C.

(57) ABSTRACT

A vertical downflow type flue gas denitrification apparatus which has a plurality of catalyst blocks, each incorporating a catalyst unit provided therein, is provided with a first ash accumulation baffle plate and a second ash accumulation baffle plate which are slidable into a gap between catalyst blocks adjacent to each other, and processes an exhaust gas emitted from a combustor and turned to a vertical downflow. The denitrification apparatus has a simple configuration where the ash accumulation baffle plates prevent ash or the like from being accumulated in the gap between the catalyst blocks. The thermal expansion of the ash accumulation baffle plate can be absorbed even under the operating conditions which produce a change in temperature, and charging and replacing the catalyst in the catalyst blocks are possible without on-site welding of the ash accumulation baffle plates.

4 Claims, 13 Drawing Sheets

FLUE GAS DENITRIFICATION APPARATUS

TECHNICAL FIELD

The present invention relates to a flue gas denitrification apparatus installed in a coal-fired boiler plant or the like, and more particularly to an ash accumulation baffle plate which is installed in a gap between catalyst blocks configured to remove nitrogen oxide (NOx) contained in an exhaust gas used in a vertical downflow type flue gas denitrification apparatus.

BACKGROUND OF THE INVENTION

Nitrogen oxide (NOx) in a flue gas discharged from an electric generation plant, a car, and others is a material that can cause urban ozone and acid rain. The most practically advanced selective catalytic reduction method in technologies that decompose NOx in the flue gas into harmless nitrogen ($N_2$) and water ($H_2O$) uses ammonia ($NH_3$) as a reducing agent and allows $NH_3$ to react with NOx in the flue gas in the presence of a denitrification catalyst.

NOx removal efficiency required for a flue gas denitrification apparatus 3 (see FIG. 9) installed in a thermal power generation boiler is calculated based on the following computational expression:

NOx removal efficiency=((inlet NOx concentration−outlet NOx concentration)/(inlet NOx concentration))×100%

Figure 9:
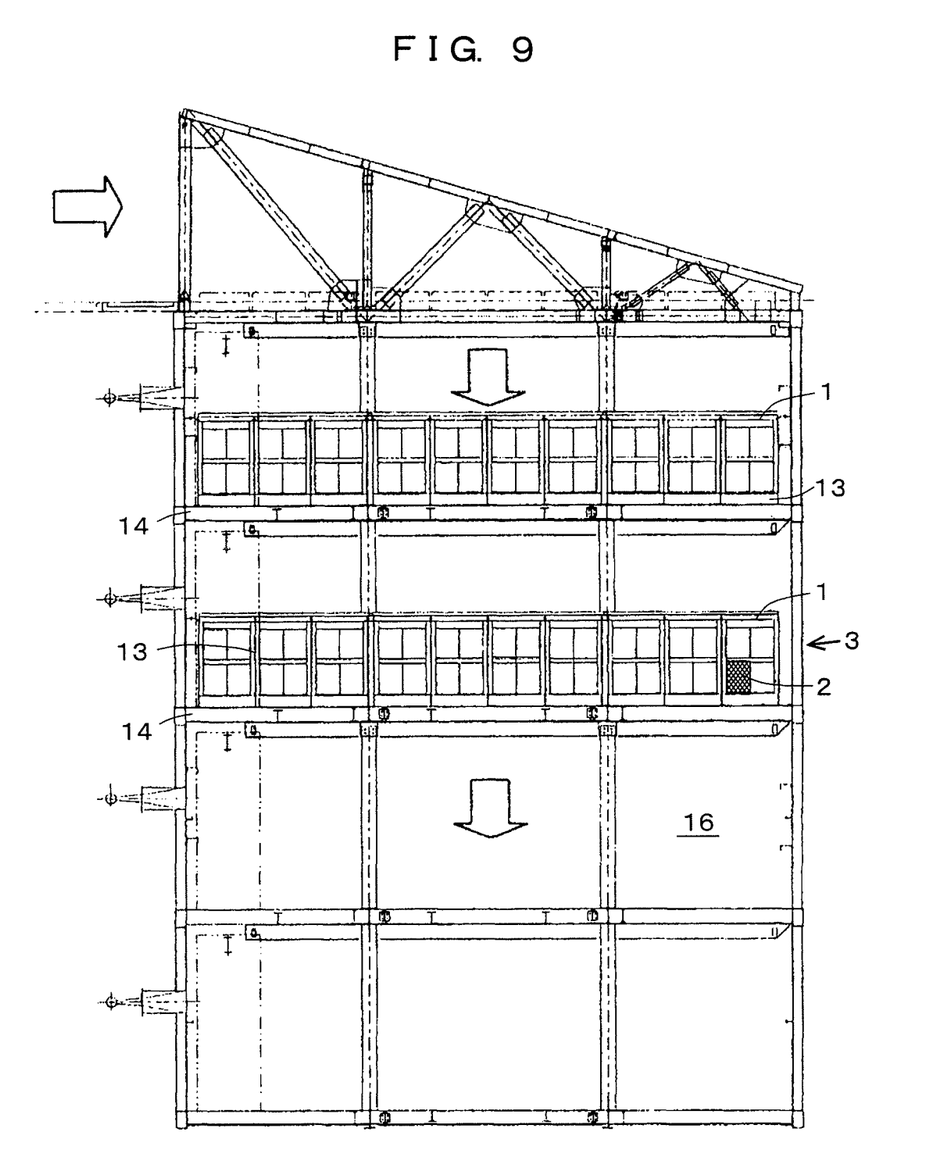
FIG. 9 is a side view of a flue gas denitrification apparatus according to an embodiment of the present invention.

To achieve the NOx removal efficiency calculated based on the computational expression, the flue gas denitrification apparatus 3 is loaded with each catalyst block 1 in which a plurality of catalyst units 2 as a minimum unit are incorporated, and the catalyst block 1 is supported by support beams 14 in the denitrification apparatus 3 (a reactor). It is to be noted that the catalyst unit 2 is formed by laminating catalyzers each having a catalyst applied to a substrate surface at fixed intervals and accommodating them in a frame.

Figure 11:
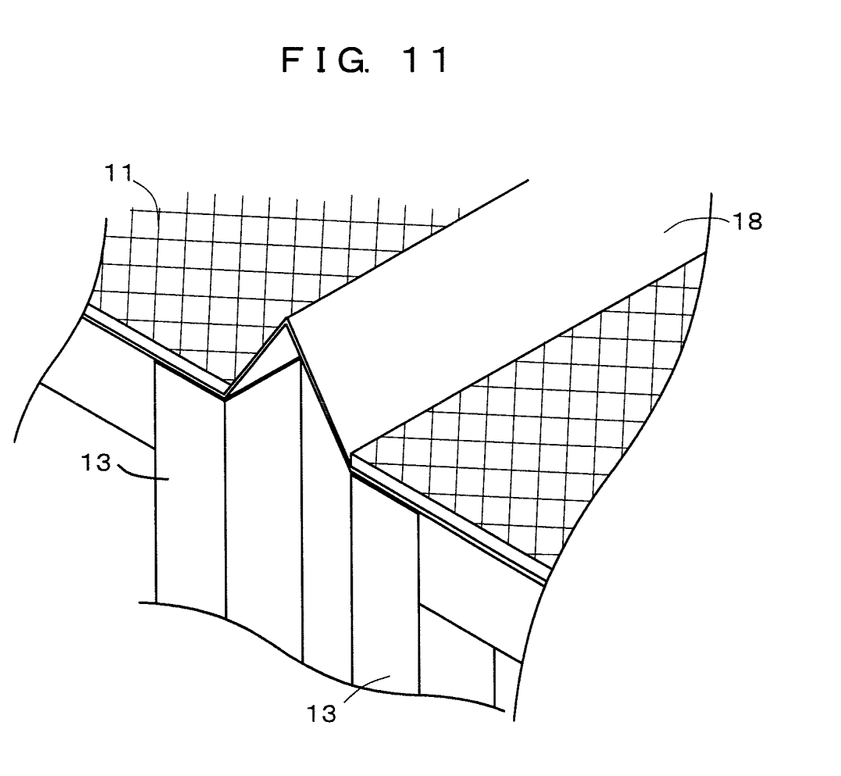
FIG. 11 is an enlarged view of a portion indicated by a circular frame S1 in FIG. 10.
Figure 12:
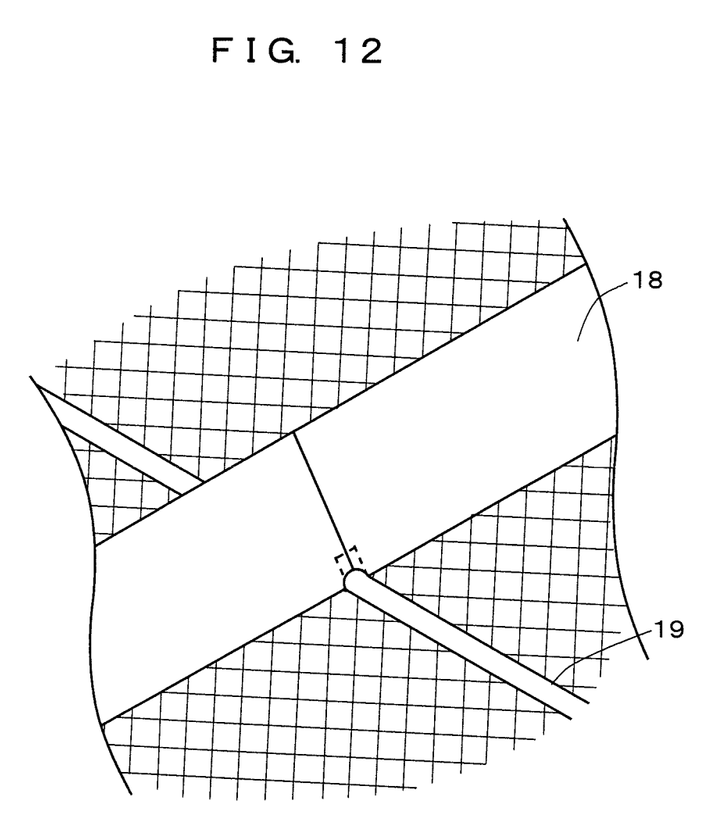
FIG. 12 is an enlarged view of a portion indicated by a circular frame S2 in FIG. 10.

In general, an exhaust gas temperature in the flue gas denitrification apparatus is as high as approximately 300 to 400° C., and a large amount of smoke dust of approximately 10 to 20 g/m$^3$N is contained. The exhaust gas containing NOx flows into the denitrification apparatus 3 from a boiler outlet and is purified by a denitrification reaction in the presence of ammonia when it passes through the catalyst block 1, but denitrification performance is considerably deteriorated by catalytic cogging when ash or the like is accumulated on the catalyst block 1. Therefore, many catalyst blocks 1 are arranged in a frame body 13 shown in FIG. 10, each angle steel 18 (shown in FIG. 11 which is an enlarged view of a circular frame S1) or each round steel 19 (shown in FIG. 12 which is an enlarged view of a circular frame S2) is arranged in a gap between the adjacent catalyst blocks 1, 1, and each angle steel 18 or each round steel 19 is welded and fixed to the frame body 13 on site where the flue gas denitrification apparatus 3 is installed, thereby avoiding deposition of the ash.

As known literatures, there are the following Patent Documents 1 and 2. In particular, as an invention described in Patent Document 2, there is disclosed a configuration that a dust attachment preventing protective equipment of angle steel is disposed on the gas upstream side between adjacent cases of catalyst unit cases arranged in a flue gas denitrification apparatus 3 and the protective equipment preventing attachment of dust is disposed between a gap between catalyst units adjacent to each other and an inner wall of the denitrification apparatus 3.

PRIOR ART DOCUMENTS

Patent Documents

Patent Document 1: Japanese Unexamined Patent Publication No. 2002-219336
Patent Document 2: Japanese Unexamined Patent Publication No. 58-143828

DISCLOSURE OF THE INVENTION

Problems to be Solved by the Invention

In the invention disclosed in Patent Document 1, a welded construction is adopted for the protective equipment preventing attachment of dust, and cracks due to thermal expansion are not taken into consideration. However, a change in temperature which is caused at a time of startup and stop of a combustor such as a boiler likewise produces a temperature distribution in the flue gas denitrification apparatus arranged at a position relatively close to an exhaust gas outlet of the combustor. Further, although the invention disclosed in Patent Document 2 is a technology for preventing deposition of dust, a specific attachment method of the angle dust attachment preventing protective equipment or the like which is disposed in a gap between adjacent cases in the catalyst unit cases and provided on the gas upstream side is not disclosed.

Figure 10:
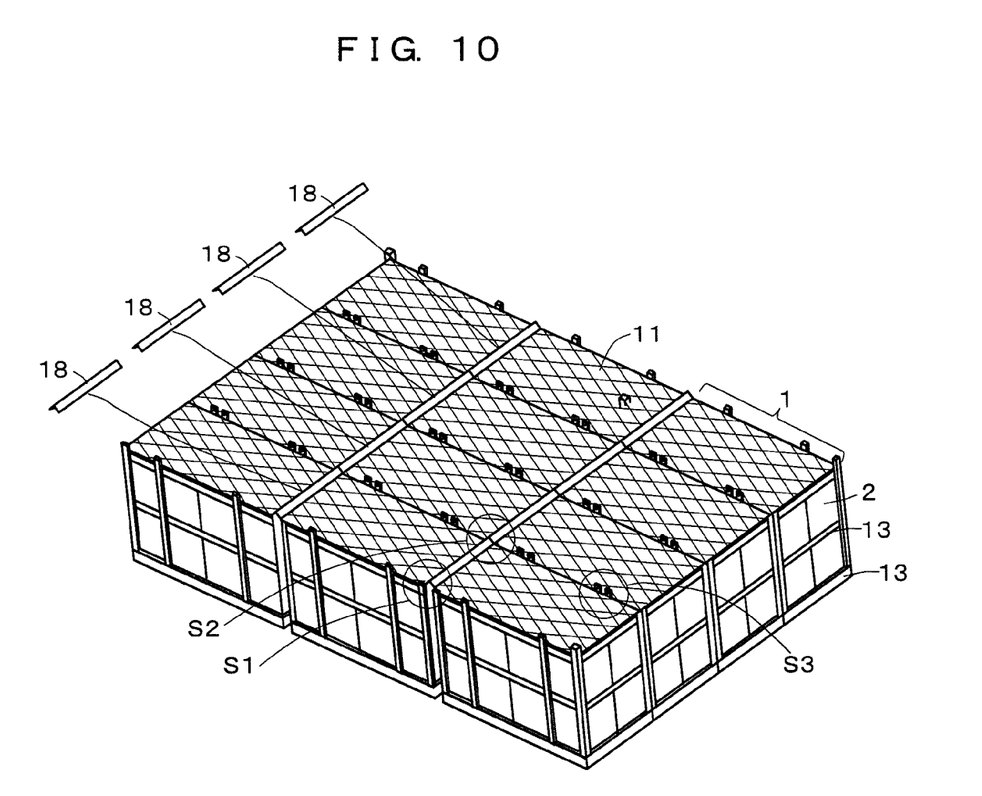
FIG. 10 is a perspective view and a partially enlarged view of a flue gas denitrification apparatus in which an ash accumulation baffle plate is installed between catalyst blocks according to a conventional example.

In the attachment configuration of the protective equipment preventing attachment of dust, e.g., the angle steel 18 or the round steel 19 disposed between the adjacent cases in the catalyst block 1 according to the conventional technology shown in FIG. 10, a temperature distribution in the flue gas denitrification apparatus 3 produces thermal stress due to an expansion and contraction difference caused by a difference in temperature depending on an arrangement position of the catalyst block 1, an intermittently-welded portion of the protective equipment preventing attachment of dust may possibly crack or the welded portion may possibly crack due to vibration and the like at a time of operating the flue gas denitrification apparatus 3, and ash or ammonia sweeps past the cracked portion together with the exhaust gas, which results in a problem that the denitrification performance is affected. Further, when the weld cracking occurs, maintenance and repair must be carried out during stop of the operation of the combustor.

Figure 13:
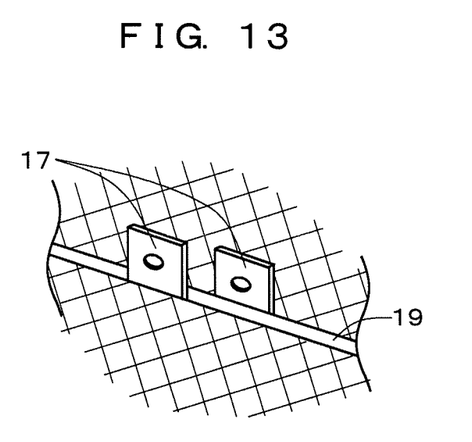
FIG. 13 is an enlarged view of a portion indicated by a circular frame S3 in FIG. 10.

Furthermore, ash becomes attached to/accumulated on an inclined portion and its periphery of the angle steel 18 (FIG. 11 which is an enlarged view of the circular frame S1 in FIG. 10) arranged in a gap between the catalyst blocks 1, 1 shown in FIG. 10 according to a conventional technology, an R portion of the round steel 19 (FIG. 12 which is an enlarged view of a circular frame S2 in FIG. 10), or suspension rugs 17 (FIG. 13 which is an enlarged view of a circular frame S3 in FIG. 10) provided to a frame body 13, this attachment/accumulation of ash tends to grow with time, a sediment of ash becomes a lump during a prolonged operation of the flue gas denitrification apparatus 3, and an exhaust gas circulation space in each catalyst block 1 may be possibly blocked.

Moreover, the flue gas denitrification apparatus 3 is loaded with necessary quantities of the catalyst blocks 1 that meet the denitrification performance, then the dust attachment preventing equipment, e.g., the angle steel 18 and the round steel 19 between the catalyst blocks 1, 1 adjacent to each other is welded on site, and hence the site work processes increases, thereby requiring a great deal of work and cost. Additionally, when the catalyst block 1 must be replaced due to catalyst degradation after the prolonged operation of the flue gas denitrification apparatus 3, the protective equipment preventing attachment of dust comprising of the angle steel 18 and the round steel 19 must be cut and decomposed in order to carry out the existing catalyst block 1.

It is, therefore, an object of the present invention to provide a vertical downflow type flue gas denitrification apparatus comprising a simple dust accumulation baffle plate which can minimize dust accumulation on a catalyst block surface in a configuration where ash or the like is not accumulated in a gap between catalyst blocks, absorb thermal expansion even under the operating conditions which produce a change in temperature, and does not require an on-site welding operation at a time of charging and replacing a catalyst.

Means for Solving the Problems

The problem of the present invention is solved by the following configuration.

A first aspect of the present invention provides a vertical downflow type flue gas denitrification apparatus, which processes an exhaust gas emitted from a combustor and turned to a vertical downflow, the apparatus comprising: a plurality of catalyst blocks (1), each incorporating a catalyst unit (2); wherein a first ash accumulation baffle plate (9) and a second ash accumulation baffle plate (10) are provided in a gap between catalyst blocks (1, 1) adjacent to each other and are slidable into the gap.

A second aspect of the present invention provides the vertical downflow type flue gas denitrification apparatus according to the first aspect, wherein an upper portion of the first ash accumulation baffle plate (9) has an angle structure, and a lower portion of the first ash accumulation baffle plate (9) has a hook (9a) which is inserted into a space between a lower portion of a protector (11) arranged on an upper portion of each catalyst block (1) and the upper portion of each catalyst block (1).

A third aspect of the present invention provides the vertical downflow type flue gas denitrification apparatus according to the first aspect, wherein a slotted hole (4a) is provided in a suspension rug (4) provided to suspend each catalyst block (1), and the second ash accumulation baffle plate (10) is detachably supported by locking members (5-7) which are inserted into the slotted hole (4a) of the suspension rug (4).

Effects of the Invention

According to the first aspect of the present invention, since the first ash accumulation baffle plate 9 which does not require the welding operation on site where a combustor such as a boiler is installed slidably disposed to the flue gas denitrification apparatus 3, it is possible to cope with, cracks in the welded portion due to thermal stress caused by an expansion and contraction difference based on a change in temperature in the denitrification apparatus 3, cracks in the welded portion caused due to vibration and the like during an operation, or tolerance between members at a time of setting up the catalyst blocks 1.

According to the second aspect of the present invention, in addition to the effect of the invention of the first aspect, when the first ash accumulation baffle plate 9 is disposed to the flue gas denitrification apparatus 3 by the simple method, i.e., inserting the hook 9a provided to the first ash accumulation baffle plate 9 into a space between the lower portion of the protector 11 of the catalyst block 1 and the upper portion of the catalytic block 1, a weight of the protector 11 itself can prevent uplift, the first ash accumulation baffle plate 9 which does not come off by vibration and the like can be installed, the ash accumulation between the catalyst blocks 1, 1 can be thereby minimized, falling and accumulation of an ash lump onto the catalyst surface can be reduced, and the denitrification performance can be improved.

According to the third aspect of the present invention, in addition to the invention according to the first aspect, since the slotted hole 4a is provided in the suspension rug 4 configured to suspend each catalytic block 1, the second ash accumulation baffle plate 10 can be detachably supported by the locking members 5-7 inserted in the slotted hole 4a, welding the suspension rug 4 to the frame body 13 or the like is no longer necessary, and the suspension rug 4 can be easily removed.

DETAILED DESCRIPTION OF THE PREFERRED EMBODIMENTS

An embodiment according to the present invention will now be described hereinafter with reference to FIG. 1.

Figure 1:
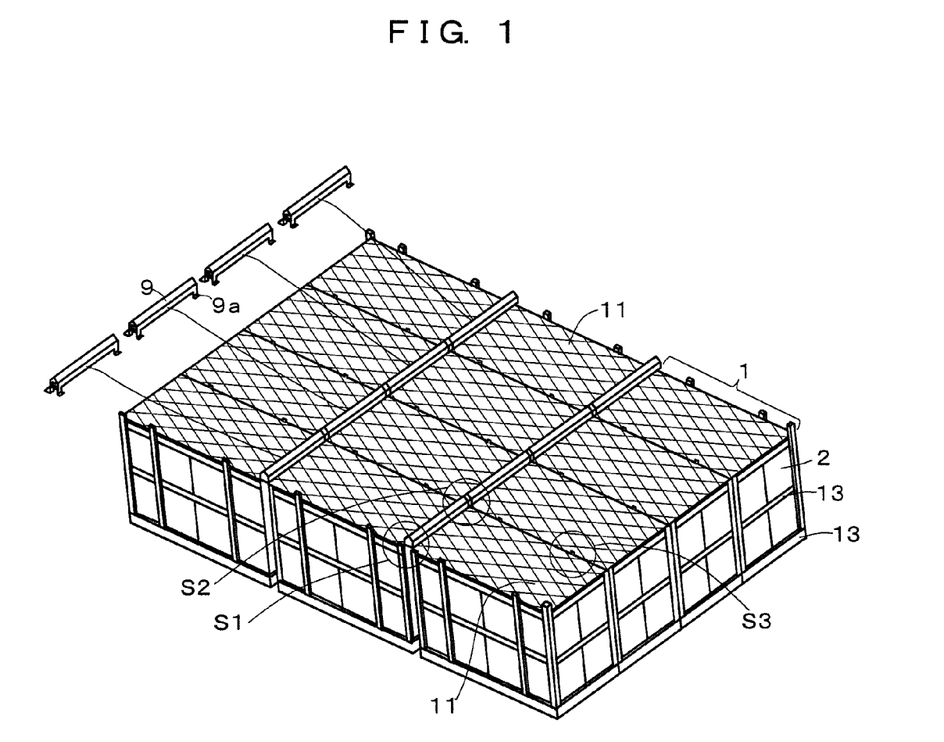
FIG. 1 is a partially perspective view of a flue gas denitrification apparatus in which an ash accumulation baffle plate is installed between catalyst blocks according to an embodiment of the present invention.

FIG. 1 shows a perspective view when a plurality of catalyst blocks 1 each comprising an ash accumulation baffle plate according to this embodiment applied to the flue gas denitrification apparatus in FIG. 9 are accommodated in a frame body 13.

In an example shown in FIG. 1, two-tiered catalyst units 2 are incorporated in the frame body 13, six catalyst units constitute one catalyst block 1, and one catalyst block 1 is aligned and arranged in each of a plurality of partitions provided in the frame body 13. FIG. 1 shows an example where twelve catalyst blocks 1 are arranged in the frame body 13, and the frame body 13 having the twelve catalyst blocks 1 accommodated therein is arranged in a direction to cut across an exhaust gas duct 16 along which a vertical downflow is formed.

As shown in FIG. 9 which is a side view of the flue gas denitrification apparatus, the twelve catalyst blocks 1 are arranged in a plurality of layers in vertical direction in the exhaust gas duct 16 through which the exhaust gas vertical downflow passes, and they are accommodated in each frame body 13 supported on each support beam 14 to constitute the flue gas denitrification apparatus.

Figure 2:
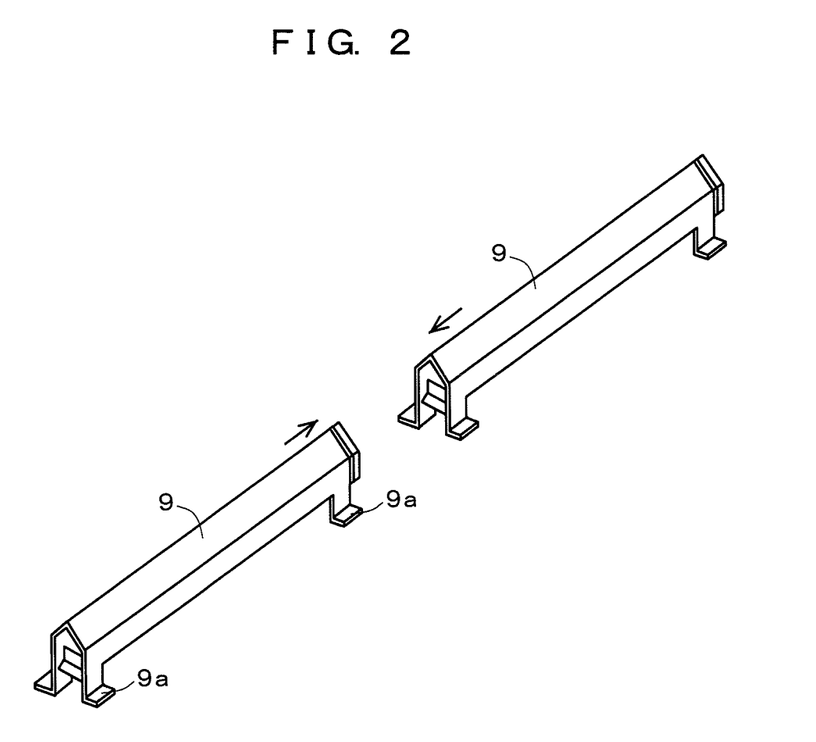
FIG. 2 is a perspective view showing a first ash accumulation baffle plate in FIG. 1.
Figure 3:
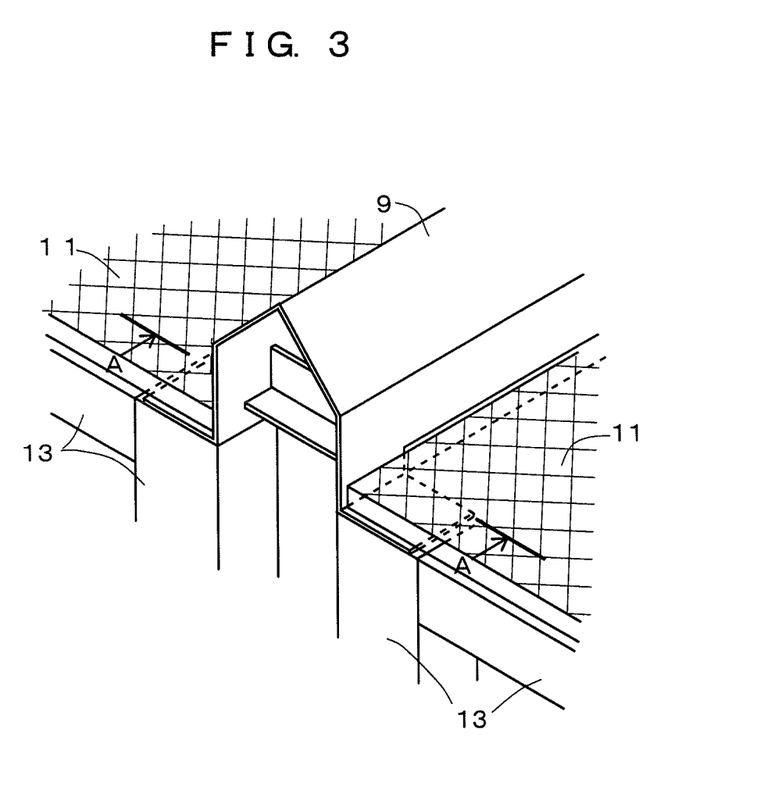
FIG. 3 is an enlarged view of a portion indicated by a circular frame S1 in FIG. 1.
Figure 4:
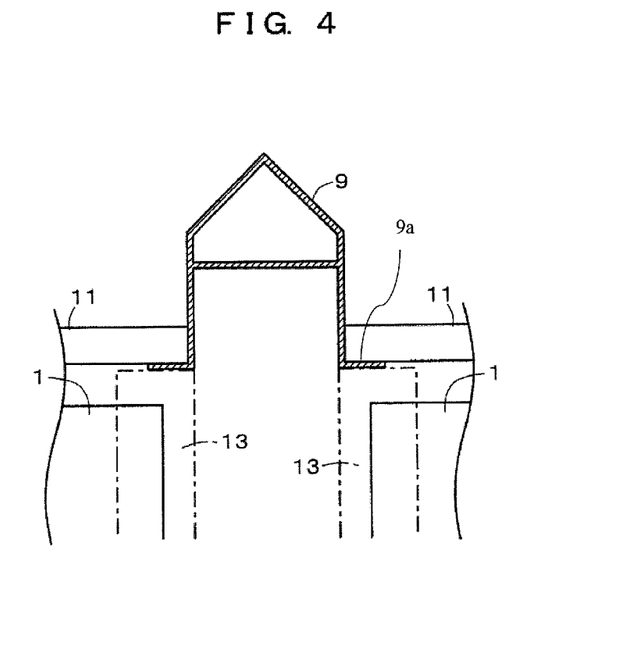
FIG. 4 is an arrow view taken along a line A-A in FIG. 3.

A configuration of an ash accumulation baffle plate of the flue gas denitrification apparatus differs depending on presence/absence of suspension rugs 4. From FIG. 2 to FIG. 4 show a first ash accumulation baffle plate 9 having no suspension rug 4. FIG. 2 shows a perspective view of the first ash accumulation baffle plate 9 in FIG. 1, FIG. 3 shows an enlarged view of a portion indicated by a circular frame S1 in FIG. 1, and FIG. 4 shows an arrow view taken along a line A-A in FIG. 3.

As shown in FIG. 2 and FIG. 4, the first ash accumulation baffle plate 9 is a member which is formed of a sheet material (a board thickness: 1.6 mm), has an angle top portion formed on an upper portion in the longitudinal direction by bending, both sidewall portions provided to extend toward the lower side in the vertical direction from the angle top portion, and hooks 9*a* extending in the horizontal direction at both ends of lower end portions of both the sidewall portions, and the plurality of first ash accumulation baffle plates 9 are arranged at positions where they fill gaps between the catalyst blocks 1, 1 that are adjacent to each other. Further, as shown in FIG. 3, a protector 11 is arranged above each catalyst block 1.

Further, just inserting the hook 9*a* of the first ash accumulation baffle plate 9 into a space between the lower side of the protector 11 and the upper portion of the catalyst block 1 enables closing the gap between the catalyst blocks 1, 1. Since there is the gap of approximately 10 mm between the protector 11 and the frame body 13 of the catalyst blocks 1 to facilitate the insertion and the protector 11 of the catalyst blocks 1 has a light weight, the protector 11 can be lifted up, and the hook 9*a* of the first ash accumulation baffle plate 9 can be easily inserted into the space between the lower side of the protector 11 and the upper portion of the catalyst block 1, thereby enabling the installation. Since each hook 9*a* is free without being fixed, it can be configured to absorb an installation clearance and thermal expansion of the first ash accumulation baffle plate 9. Therefore, the first ash accumulation baffle plate 9 can be not only readily disposed on site but also readily removed at the time of maintenance and repair and at the time of replacement.

Figure 5:
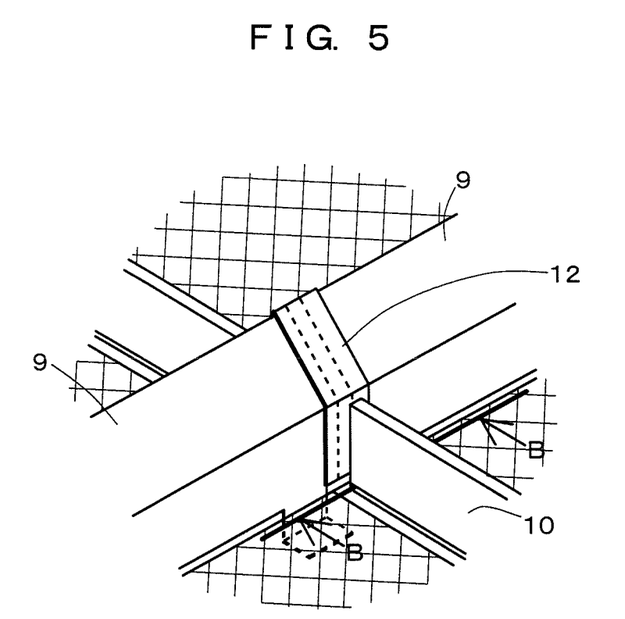
FIG. 5 is an enlarged view of a portion indicated by a circular frame S2 in FIG. 1.
Figure 6:
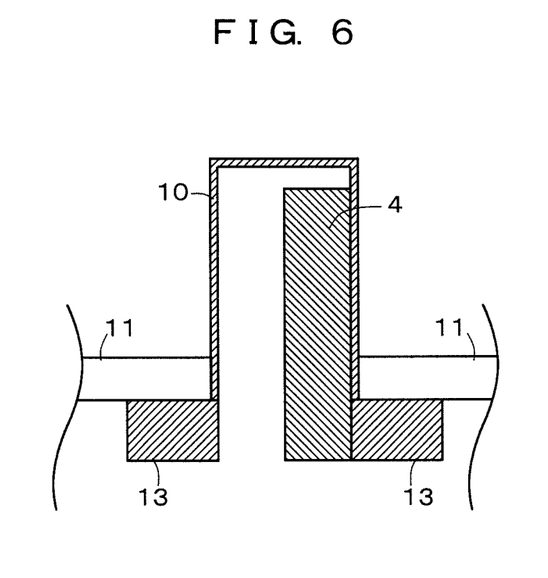
FIG. 6 is an arrow view taken along a line B-B in FIG. 5.

Furthermore, FIG. 5 shows an enlarged view of the portion indicated by the circular frame S2 in FIG. 1, and FIG. 6 shows an arrow view taken along a line B-B in FIG. 5. Although FIG. 5 is a perspective view of a connecting portion of the two first ash accumulation baffle plates 9, abutting portions of the two first ash accumulation baffle plates 9, 9 are covered with a cover 12, and a second ash accumulation baffle plate 10 made of a U-shaped sheet material is installed in the gap between the catalyst blocks 1, 1 placed at a position which is 90 degrees shifted from the gap between the catalyst blocks 1, 1 in which the first ash accumulation baffle plate 9 is installed.

Figure 7:
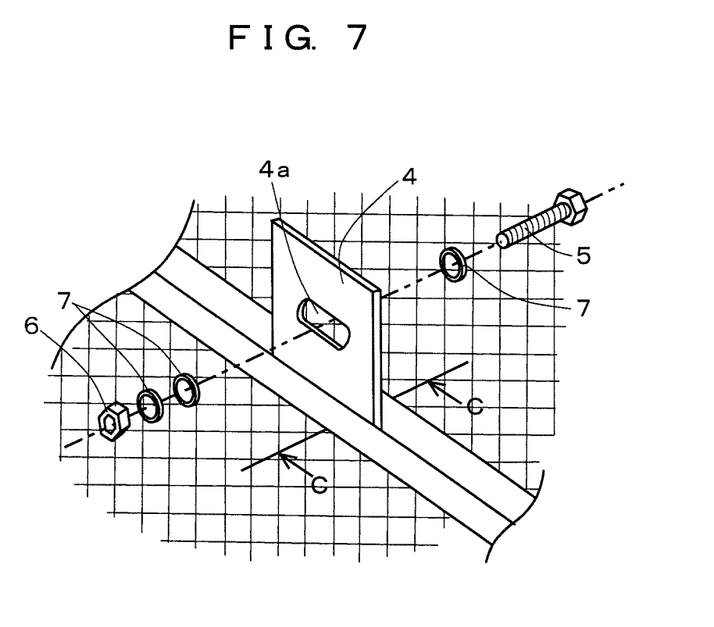
FIG. 7 is an enlarged view of a circular frame S3 in FIG. 1.
Figure 8:
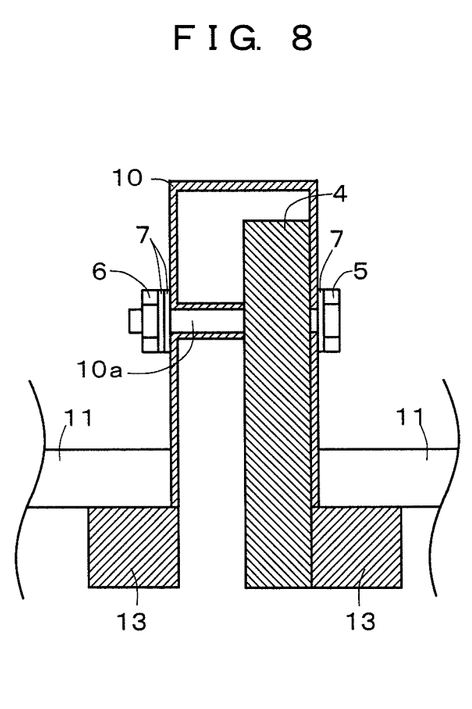
FIG. 8 is an arrow view taken along a line C-C in FIG. 7.

As shown in FIG. 7 (the second ash accumulation baffle plate 10 is not shown) that is an enlarged view of a circular frame S3 in FIG. 1 and FIG. 8 that is an arrow view taken along a line C-C in FIG. 7, the second ash accumulation baffle plate 10 is formed of a U-shaped sheet material that covers the suspension rug 4 supported by the frame body 13 provided in the gap between the two catalyst blocks 1, 1 adjacent each other and is supported by the frame bodies 13 in such a manner that lower end portions face each other, a bolt 5 is inserted into a through hole 10*a* provided on both side surfaces of the U-shaped sheet material and a hole 4*a* of the suspension rug 4, and the second ash accumulation baffle plate 10 is locked by a nut 6 and washers 7, 7, 7.

After the bolt 5 is inserted into the hole 4*a* of the suspension rug 4, the through hole 10*a* of the second ash accumulation baffle plate 10 is closed by the washers 7, 7, 7, and hence ash does not pass through this hole. However, since the hole 4*a* of the suspension rug 4 is a slotted hole having a diameter larger than that of the bolt 5, a locking position provided by the bolt 5, the nut 6, and the washers 7 can be easily adjusted and, in addition, even if there is a difference in thermal expansion coefficient between the second ash accumulation baffle plate 10 and the suspension rug 4 or the catalyst blocks 1, 1, this difference can be absorbed.

In the ash accumulation preventive configuration shown in FIG. 10 according to a conventional technology, adherence/accumulation of ash that may possibly turn to a lump to clog the catalyst and deteriorate the SCR performance was confirmed at or around suspension rugs 17 of each catalyst block 1, an R portion of each round steel 19, and inclined portions of each angle steel 18 during a prolonged operation.

On the other hand, in the first ash accumulation baffle plate 9 having the angle structure or the second ash accumulation baffle plate 10 having the U-like shape according to this embodiment, cracks or ash accumulation caused due to a temperature change or vibration was not observed. Moreover, leakage of the exhaust gas was not observed. Additionally, an on-site welding operation, a removal operation, and others at the time of loading and replacement of each catalyst block 1 are not required, and the site work processes can be reduced.

INDUSTRIAL APPLICABILITY

The present invention can be mainly applied to the denitrification apparatus of a thermal power generation boiler, its installation procedure is simple, welding is not required, and hence the present invention can be effectively used even in a short loading operation period with a large catalyst quantity.

DESCRIPTION OF THE REFERENCE NUMERALS

1 catalyst block
2 catalyst unit
3 flue gas denitrification apparatus
4 catalyst block suspension rug
4*a* slotted hole
5 bolt
6 nut
7 washer
9 first ash accumulation baffle plate
9*a* hook
10 second ash accumulation baffle plate
10*a* through hole
11 protector
12 cover
13 frame body
14 support beam
16 exhaust gas duct
17 suspension rug (conventional example)
18 angle steel (conventional example)
19 round steel (conventional example)

What is claimed is:
1. A vertical downflow type flue gas denitrification apparatus, which processes an exhaust gas emitted from a combustor and turned to a vertical downflow, the apparatus comprising:
a plurality of catalyst blocks, wherein each of the catalyst blocks incorporate a catalyst unit;

each of the catalyst blocks being provided within a corresponding frame body, wherein a first ash accumulation baffle plate and a second ash accumulation baffle plate are provided in a gap between frame bodies of catalyst blocks that are adjacent to each other, wherein the first ash accumulation baffle plate and the second ash accumulation baffle plate are slidable into the gap, and an upper portion of the first ash accumulation baffle plate has an angle structure, and a lower end portion of the first ash accumulation baffle plate has a hook which is placed on the corresponding frame body; and a protector placed on a top surface of the hook.

2. The vertical downflow type flue gas denitrification apparatus according to claim 1, wherein a slotted hole is provided in a suspension rug provided to suspend each catalyst block, and the second ash accumulation baffle plate is detachably supported by locking members which are inserted into the slotted hole of the suspension rug.

3. The vertical downflow type flue gas denitrification apparatus according to claim 1, wherein the hook is placed on a top surface of the corresponding frame body.

4. The vertical downflow type flue gas denitrification apparatus according to claim 3, wherein the hook is inserted into a space defined between a lower portion of the protector and the top surface of the corresponding frame body.

* * * * *